No. 758,132. PATENTED APR. 26, 1904.
G. M. GEST.
MACHINE FOR SATURATING INSULATING MATERIAL.
APPLICATION FILED MAR. 16, 1903. RENEWED MAR. 21, 1904.
NO MODEL.
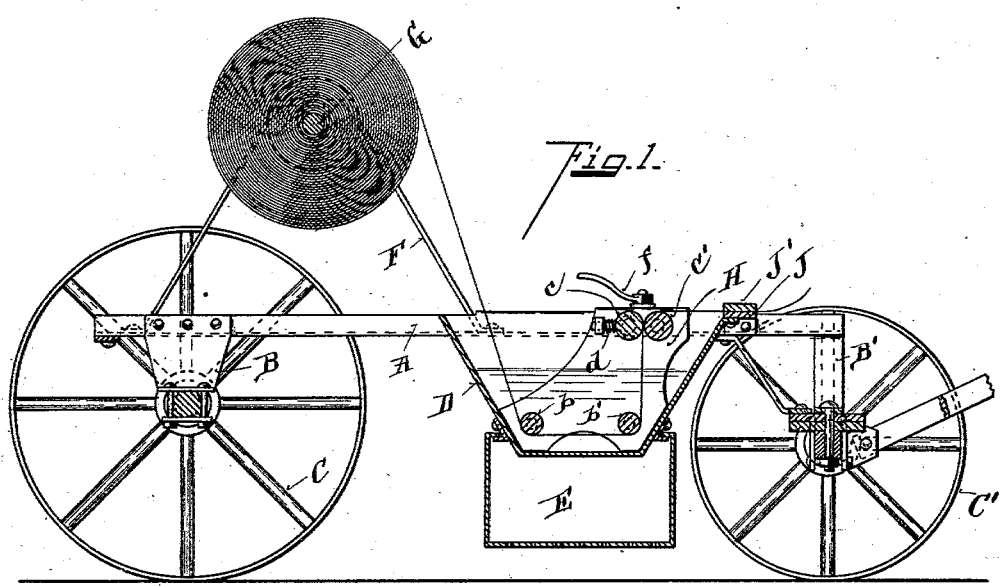
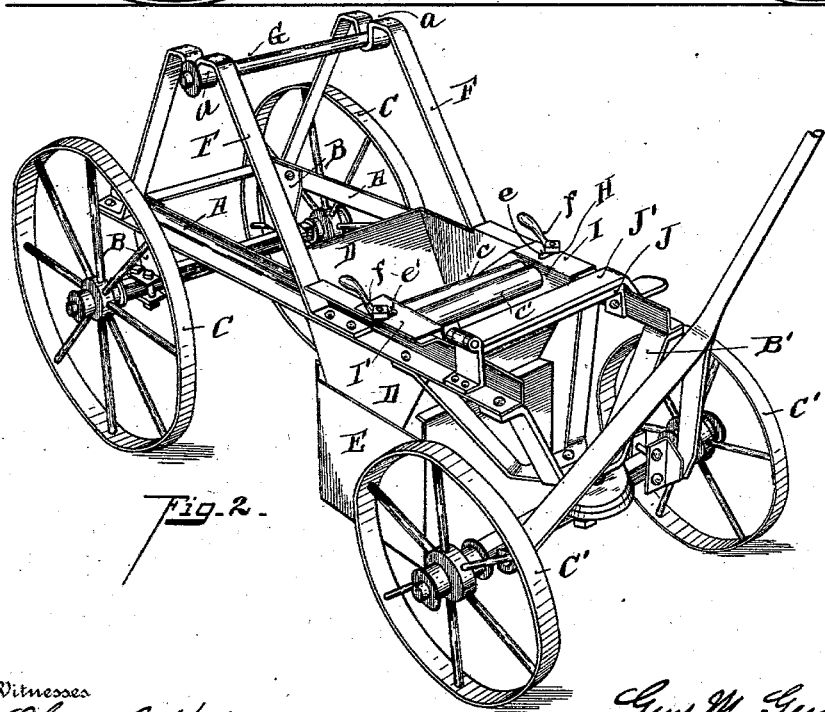

No. 758,132. Patented April 26, 1904.

UNITED STATES PATENT OFFICE.

GUY M. GEST, OF CINCINNATI, OHIO.

MACHINE FOR SATURATING INSULATING MATERIAL.

SPECIFICATION forming part of Letters Patent No. 758,132, dated April 26, 1904.

Application filed March 16, 1903. Renewed March 21, 1904. Serial No. 199,189. (No model.)

*To all whom it may concern:*

Be it known that I, GUY M. GEST, a citizen of the United States, residing at Cincinnati, in the county of Hamilton and State of Ohio, have invented certain new and useful Improvements in Machines for Saturating Insulating Material, of which the following is a specification.

My invention relates to a device for conveniently carrying, preparing, and delivering burlap such as is used in wrapping the joints of conduits in underground work.

The features of my invention are more fully set forth in the description of the accompanying drawings, forming a part of this specification, in which—

Figure 1 is a central vertical section of my improvement. Fig. 2 is a perspective view of the same.

Hitherto burlap has been done up in bales and had to be carried from place to place along the line of excavation in pipe-laying and manually untangled from the bale and carried to the tar-pot and there coated with tar before wrapping the joint. This is an obviously cumbersome operation, and it is my object to dispense with this old method, to which end I have provided the machine I will now describe.

A represents a supporting-frame having depending pillars B B', in which are detachably journaled the wheels C C', as shown in Fig. 1. From this frame A is detachably suspended between the wheels a tar-tank D, in which the tar is melted. Detachably suspended upon the lower end of this tar-tank D is the firebox E, containing charcoal or other convenient method of portably heating.

F represents a V-shaped frame elevated upon the support A, in the apex of which are the journal-loops $a$. Within these loops $a$ is detachably suspended the burlap roll or shaft G. The burlap is prepared in suitable widths, preferably three-inch strips, and wound upon this roll, and thus supported above the frame. The burlap is in thin strips about two and a half inches in width and in rolls from two to three feet in diameter. As I use a small saturating-pot, it is desirable to hold the supply-roll above and to the rear of this saturating-tank to avoid gumming the roll, which would interfere with its delivery. Therefore the frame in rear of this saturating-tank is a skeleton frame, above which is elevated the V-frame, adapted to interchangeably receive supply-rolls of burlap. Within the tar-tank B is a detachable frame H, within which are journaled the guide-rolls $b$ $b'$, near the bottom of the tank D, for immersing the strip in the tar-bath. At the top of the frame and at the top of the tank are the delivery-rolls $c$ $c'$, one of which is held against the other, preferably by a spring tension $d$, as shown in Fig. 1. The top of this frame H has lateral flanges I I', provided with slots $e$ $e'$ for the reception of the fastening-bolts $f$. These flanges I I' overhang the sides of the tar-tank D, so that the frame is suspended in the tank carrying all of the roll, and it is readily detached therefrom for cleaning, renewing the tar, &c.

J represents a bar straddling the frame A in front of the delivery-rolls $c$ $c'$, on top of which is hinged a second bar J', between which bars the burlap strip passes from the delivery-rolls for conveniently tearing or cutting.

It is obvious that this device is very simple and admirably adapted for the purpose for which it is intended. The parts are renewable and detachable.

Having described my invention, I claim—

In a machine for saturating insulating material, a vehicle-frame, a tar saturating-tank on the front end, the frame being skeleton form in the rear thereof, V-shaped frame above the skeleton frame, a supply-roll interchangeably located in the apex of said V-frame, a fire-box suspended under said tar-tank, a removable frame in the tar-tank, saturating-rolls journaled in the lower part and delivery-rolls in the upper part of said detachable frame, substantially as specified.

In testimony whereof I have hereunto set my hand.

GUY M. GEST.

Witnesses:
 OLIVER B. KAISER,
 IDA J. LUCAS.